(12) United States Patent
Henry et al.

(10) Patent No.: US 10,623,119 B1
(45) Date of Patent: Apr. 14, 2020

(54) DYNAMIC LOCATION ACCURACY DEVIATION SYSTEM

(71) Applicant: Cisco Technology, Inc., San Jose, CA (US)

(72) Inventors: Jerome Henry, Pittsboro, NC (US); Indermeet Singh Gandhi, Bangalore (IN); Robert Edgar Barton, Richmond (CA); Vishal Satyendra Desai, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/565,362

(22) Filed: Sep. 9, 2019

(51) Int. Cl.
| | |
|---|---|
| *H04W 64/00* | (2009.01) |
| *H04B 17/27* | (2015.01) |
| *H04B 17/318* | (2015.01) |
| *H04B 17/21* | (2015.01) |

(52) U.S. Cl.
CPC ............. *H04B 17/27* (2015.01); *H04B 17/21* (2015.01); *H04B 17/318* (2015.01); *H04W 64/003* (2013.01)

(58) Field of Classification Search
CPC ............................... H04W 64/00; H04W 4/02
See application file for complete search history.

(56) References Cited

U.S. PATENT DOCUMENTS

| | | | |
|---|---|---|---|
| 9,715,005 B2 | 7/2017 | Hughes et al. | |
| 2010/0039929 A1 | 2/2010 | Cho et al. | |
| 2014/0148196 A1 | 5/2014 | Bassan-Eskenazi et al. | |
| 2014/0349671 A1 | 11/2014 | Lakhzouri et al. | |
| 2018/0014271 A1* | 1/2018 | Worsfold | H04W 64/00 |
| 2018/0199171 A1* | 7/2018 | Annamalai | G01S 1/042 |
| 2019/0053007 A1* | 2/2019 | Theurer | G16Z 99/00 |

FOREIGN PATENT DOCUMENTS

CN         102215565 A         10/2011

* cited by examiner

*Primary Examiner* — Michael T Vu
(74) *Attorney, Agent, or Firm* — Polsinelli PC

(57) ABSTRACT

The present technology pertain to a continuous calibration performed by real-time location system controller to continuously calibrate itself to handle data received from network infrastructure devices more accurately, and to use this continuous calibration to accurately predict a location of a portable computing device.

12 Claims, 4 Drawing Sheets

DYNAMIC LOCATION ACCURACY DEVIATION SYSTEM

TECHNICAL FIELD

The present technology pertains to identifying locations of wireless devices indoors, and more specifically pertains to repeatedly and automatically calibrating a location controller to account for changes in a Wi-Fi environment.

BACKGROUND

Enterprise networks can track locations of wireless devices using radio frequency location tracking techniques. Enterprises can use existing wireless infrastructure such as wireless access points, and sensors to report measurements from which the location of a wireless device can be approximated. Several techniques or combinations of techniques can be used including time of arrival, time difference of arrival, received signal strength, and angle of arrival techniques.

The most common technique utilizes received signal strength (RSS) information. Access points, typically mounted on the ceiling, can receive a signal from a wireless device, typically near ground level (desk surface, in a user's hand or pocket, etc.) and detects the average signal level of transmissions between the wireless device and each access point. The signal level can be used to derive a distance from each access point. An indoor location controller can determine points in which the distances from two or more access points overlap and can thereby determine probable locations that the wireless device might be located. The more access points that provide signal level data pertaining to that wireless device, the more accurately the probable location will match the true location.

While all of the techniques or combinations of techniques listed above perform well in the right circumstance, determining location indoors is a challenge for all of the techniques. Determining location indoors is a challenge due to the fact that the radio frequency environment is influenced by obstacles such as walls, and interference from other radio frequency emitting devices and electronics in the environment.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
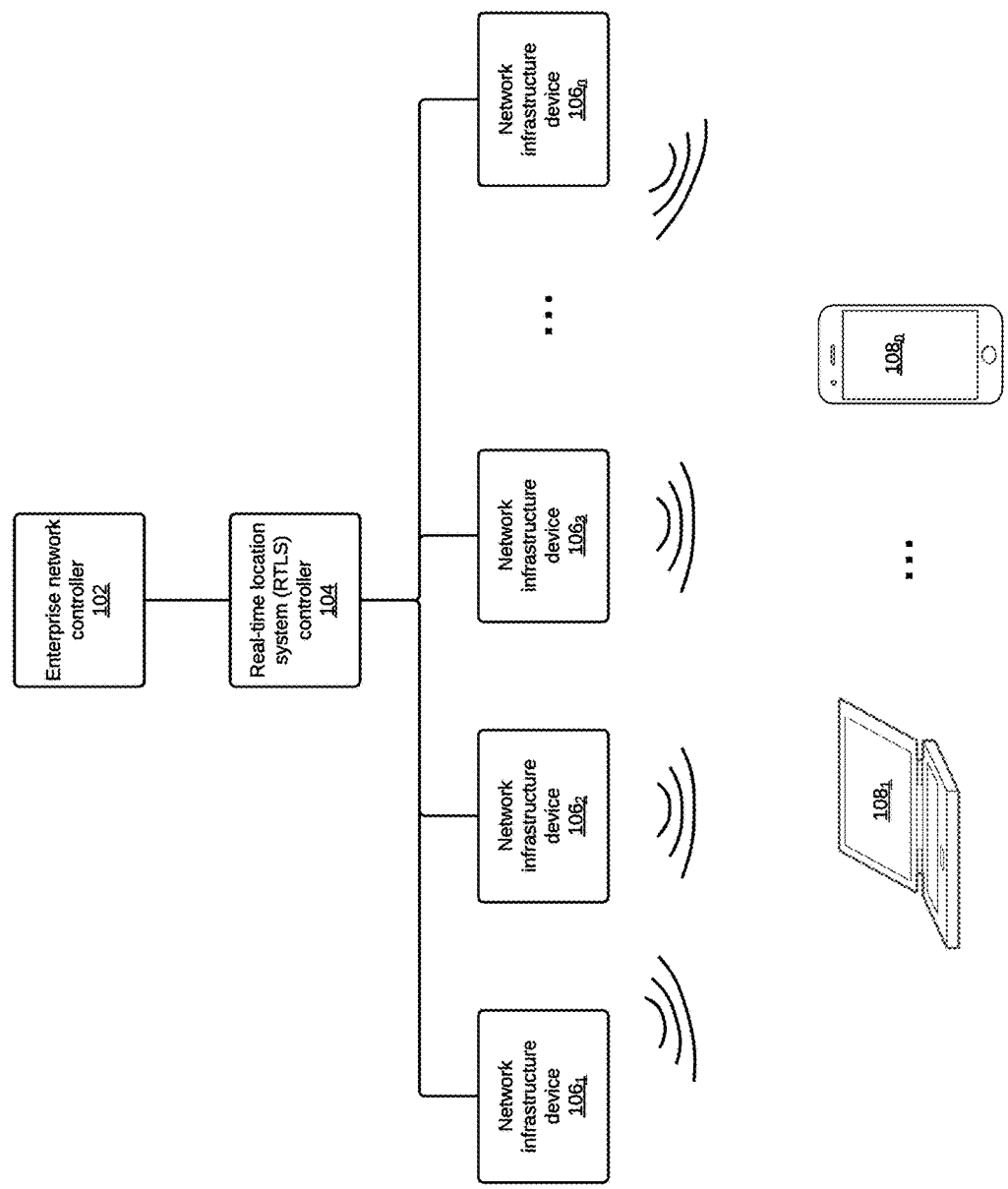
FIG. 1 illustrates an example system embodiment for carrying out the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to continuous calibration by a real-time location system controller to handle data received from network infrastructure devices more accurately, and to use this continuous calibration to accurately predict a location of a portable computing device.

In some embodiments, the present technology can periodically receive measurements, from at least two network-infrastructure devices. The measurements can be interpreted by a real-time location system controller to derive a location of a first one of the network-infrastructure devices. The respective measurements are relative to a distance from the at least two of the network-infrastructure devices to the first one of the plurality of network-infrastructure devices. Based on the periodically received measurements, the real-time location system controller can repeatedly derive a calculated location of the first of the network-infrastructure devices. The real-time location system controller can determine that the calculated location of the first one of the plurality of network-infrastructure devices is different than the known location of the first one of the plurality of network-infrastructure devices, and apply at least one elasticity coefficient to at least one measurement from at least two of the plurality of network-infrastructure devices from which the measurements were received.

In some embodiments, a real-time location system controller can, at a first time, receive measurements regarding a location of a first network-infrastructure device having a known location from a plurality of other network-infrastructure devices each having a respective known location. Using the measurements at the first time, the real-time location system controller can calculate a location of the first network-infrastructure device to yield a calculated location, at the first time, for the first network infrastructure device. The real-time location system controller can compare the calculated location of the first network-infrastructure device to the known location of the first network-infrastructure device, and determine a first discrepancy between the calculated location of the first network-infrastructure device and the known location of the first network-infrastructure device. The real-time location system controller can apply a first elasticity coefficient to the measurements from at least one of the plurality of other network-infrastructure devices that when applied to the measurements received at the first time results in a determination that the first network-infrastructure device is located at the known location for the first network-infrastructure device.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for an improved indoor location system using wireless infrastructure. As addressed above, determining location indoors is a challenge due to the influence of obstacles such as walls, and interference from other radio frequency emitting devices and electronics in the environment. While some indoor location solutions attempt to overcome this challenge by taking measurements within the environment to determine average deviations from theoretical, expected values, and then apply a persistent adjustment coefficient to compensate for this average observed deviation, such a solution is not enough.

Even when using the persistent adjustment coefficient to compensate for this average observed deviation, such a solution treats an average in an area as applicable to all measurements from all devices, and from all planes of measurement. The amount of compensation a particular access point might need can be different the amount of compensation another access point might need. Even the amount of compensation a particular access point might need in one plane or direction can be different that the amount of compensation the particular access point might need in another plane or direction—as might be the case if an access point has a wall on one side. The present technology solves this problem by determining and applying different coefficients to locations derived from data different access points, and to locations derived from data recorded in one direction or plane compared to another direction or plane on the same access point.

The present technology also addresses the problem caused by the dynamic indoor radio frequency (RF) environment, such as a Wi-Fi environment. As people move around the environment, or new walls are constructed, or new equipment is installed, the measurements from a particular access point, in a particular direction might change overtime. The present technology also solves this problem by continually determining the locations of devices for which location is already known to repeatedly recalibrate the various wireless-network-infrastructure devices.

FIG. 1 illustrates an example system embodiment for carrying out the present technology. FIG. 1 shows an example network for providing wireless (Wi-Fi) access to computing devices.

In some embodiments, the system illustrated in FIG. 1 represents a portion of an enterprise network that is administrated through enterprise network controller 102. Enterprise network controller 102 can be responsible for the set up and management of various network devices and services. Enterprise network controller 102 can also be responsible for controlling access by users and devices. In general enterprise network controller 102 can handle all functions related to the management of an enterprise network.

One aspect of an enterprise network is to provide connectivity to one or more devices. FIG. 1 illustrates a plurality of network infrastructure devices 106 such as network infrastructure device $106_1$, $106_2$, $106_3$, and $106_n$ representing any number of different infrastructure devices. While an enterprise network may have other network infrastructure devices other than wireless network infrastructure devices, FIG. 1 illustrates wireless network infrastructure devices 106.

In some embodiments, a wireless network infrastructure device 106 can include a wireless access point which can provide wireless access to one or more client devices 108. In some embodiments, a wireless network infrastructure device 106 can include an active sensor, which can be located in the enterprise environment and can receive signals emitted by wireless access points and other active sensors and can report back to enterprise network controller 102 regarding measurements that reflect the performance of the wireless network or one or more wireless network infrastructure devices 106.

In some embodiments, network infrastructure devices 106 can be configured by enterprise network controller 102. Part of the configuration of network infrastructure devices 106 is to record a location in the physical environment in which a particular network infrastructure device 106 is located.

FIG. 1 also illustrates real-time location system controller 104. While real-time location system controller 104 is shown to be separate from enterprise network controller 102 or from the network infrastructure devices 106, real-time location system controller 104 can be integrated with any other computing device on the enterprise network including enterprise network controller 102 and network infrastructure devices 106.

Real-time location system controller 104 can be used to determine a location of one or more devices such as a network infrastructure device 106 (whether an access point or an active sensor), or portable computing device 108. Real-time location system controller 104 can determine a location of a wireless device using any of several techniques or combinations thereof including: time of arrival, time difference of arrival, received signal strength (RSS), and angle of arrival (AoA) techniques.

The most common technique utilizes received signal strength (RSS) information. Access points, typically mounted on the ceiling, receive a signal from a wireless device, typically near ground level (desk surface, in a user's hand or pocket, etc.) and detects the average signal level of transmissions between the wireless device and each access point. The signal level can be used to derive a distance from each access point. An indoor location controller can determine points in which the distances from two or more access points overlap and probable locations that the wireless device might be located. The more access points that provide signal level data pertaining to that wireless device, the more accurately the probable location will match the true location.

Another common technique is angle of arrival (AoA). This technique can determine a direction or plane from which a communication was transmitted by determining a direction in which an antenna is pointed that receives the strongest average signal. When this is performed by two or more devices, each device can project an imaginary plane, and the intersection point between two or more planes is the likely location of the transmitting device.

In some embodiments, real-time location system controller 104 can also be used to calibrate itself to make more accurate location estimations. Real-time location system controller 104 can receive measurements made by the various network infrastructure devices 106 that can be used to calculate the location of one or more of the network infrastructure devices 106. Since the location of each of the network infrastructure devices 106 is known, real-time location system controller 104 can determine that it is not calibrated for the current conditions present in the Wi-Fi environment when it calculates that one of the network infrastructure devices 106 is not where it is known to be.

Figure 2:
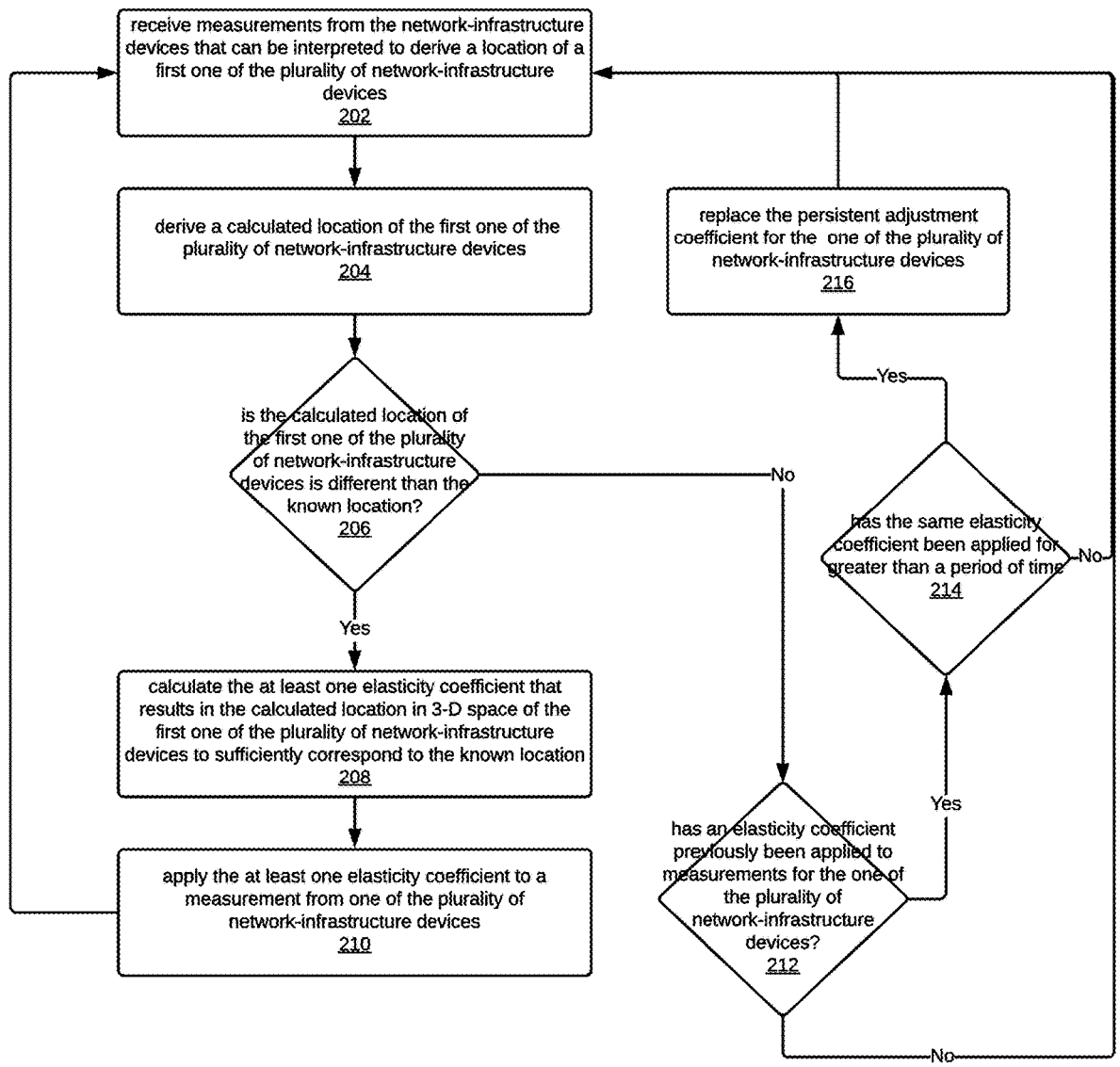
FIG. 2 illustrates an example method performed by real-time location system controller to continuously calibrate itself to handle data received from network infrastructure devices more accurately, and to use this continuous calibration to accurately predict a location of a portable computing device.

FIG. 2 illustrates an example method performed by real-time location system controller 104 to continuously calibrate itself to handle data received from network infrastructure devices 106 more accurately, and to use this continuous calibration to accurately predict a location of a portable computing device 108.

Real-time location system controller 104 can receive measurements from network infrastructure devices 106. (The measurements can be averages of a plurality of measurements taken over a short period.) These measurements can be received continuously, periodically, or at least repeatedly at a first time and repeated again at a second time as one goal real-time location system controller 104 is to calibrate itself to the current conditions of the enterprise Wi-Fi environment.

Figure 3:
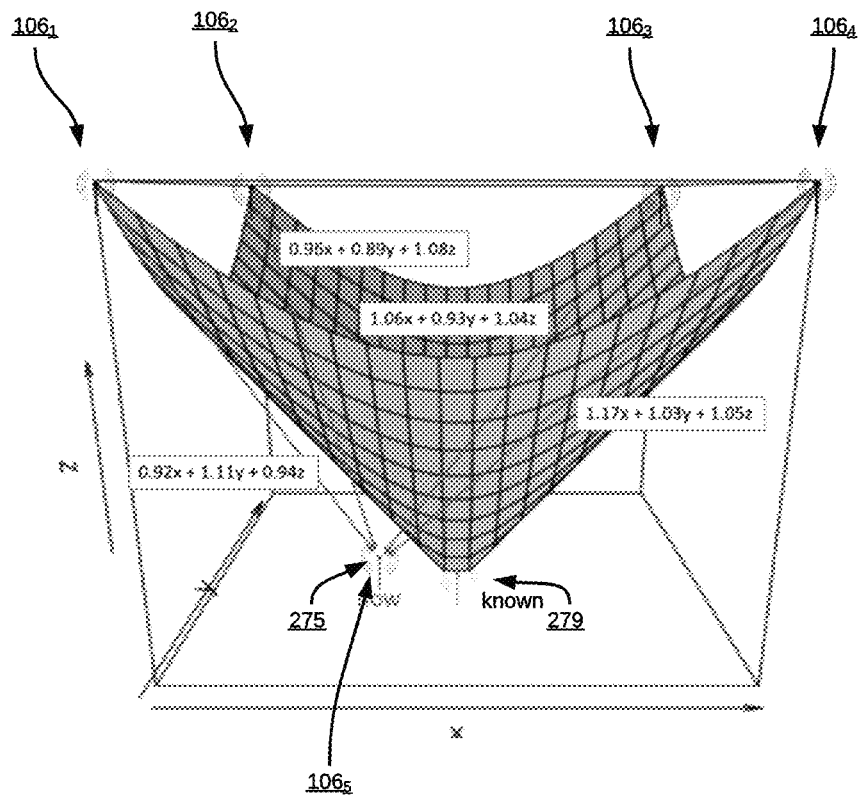
FIG. 3 illustrates an example of a calculation of a location of a network infrastructure device in accordance with some aspects of the present technology.

In some embodiments, the received (202) measurements from network infrastructure devices 106 can be measurements regarding a signal strength of nearby network infrastructure devices. For example, as illustrated in FIG. 3, network infrastructure devices 106$_1$, 106$_2$, 106$_3$, and 106$_4$ can report on measurements of received signal strength of network infrastructure device 106$_5$.

Real-time location system controller 104 can use the received measurements to derive (204) a calculated location of one of the plurality of network infrastructure devices. As illustrated in FIG. 3, measurements received from network infrastructure devices 106$_1$, 106$_2$, 106$_3$, and 106$_4$ can be used to calculate (204) the location 275 of network infrastructure device 106$_5$.

Real-time location system controller 104 can then determine (206) whether the calculated (204) location of the first one of the network infrastructure devices is different than the location that is known for that network infrastructure device. As illustrated in FIG. 3, real-time location system controller 104 can determine (206) that the calculated (204) location 275 is different than the known location 279.

When real-time location system controller 104 determines (206) that the calculated (204) location of the first one of the network infrastructure devices is different than the location that is known for that network infrastructure device, real-time location system controller 104 can calculate (208) at least one elasticity coefficient that when used to calculate the location of the first one of the network infrastructure devices results in a calculated location in three-dimensional space for the first one of the network infrastructure devices that sufficiently corresponds to the known location of the first one of the network infrastructure devices.

For example, FIG. 3 further shows a Riemanian space between network infrastructure devices 106$_1$, 106$_2$, 106$_3$, and 106$_4$ and the known location of network infrastructure device 106$_5$. Real-time location system controller 104 can calculate (208) how calculations made to derive (204) the calculated location 275 would need to be adjusted (a coefficient that can be included to make this adjustment is a elasticity coefficient) to match the Riemanian space.

In some embodiments, real-time location system controller 104 can determine that its original calculation (204) resulted in deriving a calculated location that was incorrect in one or more planes or directions. In such embodiments, the elasticity coefficient might only be applied to calculations that rely on data measured in the plane or direction in which the original calculation (204) was incorrect. In some embodiments, a different elasticity coefficient can be applied to each different direction or plane that relies on data measured in the planes or directions in which the original calculation (204) was incorrect.

An objective of performing steps 204, 206, 208 is to determine that an aspect of the Wi-Fi environment is different than expected. This can be caused by people walking around in the space covered by the Wi-Fi environment, or physical changes in the space or interference or other factors. As such, the present technology utilizes the elasticity coefficients to compensate for the aspect(s) of the Wi-Fi environment that is different than expected.

Accordingly, real-time location system controller 104 can apply (210) the at least one elasticity coefficient to a calculation to determine the location of a portable computing device when the calculation utilizes data that is collected from one of the plurality of network infrastructure devices in a portion of the Wi-Fi environment for which other measurements have needed compensation to account for aspects of the Wi-Fi environment that are different than expected.

As illustrated in FIG. 2, after real-time location system controller 104 performs step 210 the method can return to step 202. However, a more realistic description would be that the real-time location system controller 104 can be continuously performing any of the steps illustrated in FIG. 2, and the steps illustrated in FIG. 2 likely will be executed in parallel operations that amount to a continuous calibration of real-time location system controller 104 to the observed conditions of the Wi-Fi environment and continuous application of the calibration through use of the calculated coefficients to determine near real time locations of portable computing devices in the Wi-Fi environment.

As illustrated in FIG. 2, and in some embodiments, after real-time location system controller 104 has calculated (208) an elasticity coefficient to compensate for observed conditions in the Wi-Fi environment, future calculations (204) of the location of one of the plurality of network infrastructure devices may sufficiently correspond to the known location. This may repeatedly occur such that it can be assumed that the Wi-Fi environment includes a persistent change and that the elasticity coefficient should become a persistent part of the calculation of locations of portable computing devices and that part of the Wi-Fi environment. This operation is reflected in steps 212, 214, and 216.

At step 212, real-time location system controller 104 can determine (212) whether the elasticity coefficient has previously been applied to calculations for the location of one of the plurality of network infrastructure devices 106. When real-time location system controller 104 determines (212) that the elasticity coefficient has previously been applied, it can further determine (214) whether the same or approximately the same elasticity coefficient has been applied for greater than a specified period of time, and if so the real-time location system controller 104 can replace (216) the persistent adjustment coefficient for one of the plurality of network infrastructure devices with a new persistent adjustment coefficient that reflects adjustments made by the elasticity coefficient. In this way the effect of the elasticity coefficient can become persistent.

While the above description may, for simplicity, refer to calculation of one elasticity coefficient, it should be appreciated by those of ordinary skill in the art that in reality many elasticity coefficients are calculated. A different elasticity coefficient may need to be applied to calculations using data received from each different network infrastructure device 106. In other words, when determining the location of infrastructure network infrastructure device 106$_5$ in FIG. 3, a different elasticity coefficient may need to be applied to calculations regarding data from infrastructure device 106$_1$, and a different elasticity coefficient may need to be applied to calculations regarding data from infrastructure device $106_2$, and from network infrastructure device $106_3$, and from network infrastructure device $106_4$.

In some embodiments, multiple elasticity coefficients need to be provided to different measurements from the same network infrastructure device 106 when the measurements are in different planes or directions and greater signal degradation exists in one of the planes or directions than another.

The present technology provides many benefits over the previous state-of-the-art. For example, real-time location system controller 104 can calibrate itself using network infrastructure devices 106. Whereas prior systems were manually calibrated and applied a single persistent adjustment coefficient to all calculations of device location.

Additionally, real-time location system controller 104 can dynamically and repeatedly calculate elasticity coefficients so that calculations of locations of network infrastructure devices 106 and portable computing devices 108 are more accurate since they compensate for current Wi-Fi environment conditions.

Furthermore, the present technology calculates elasticity coefficients in multiple plans. Since the present technology makes use of active sensors in the network infrastructure, which are typically located at or near floor level, the present technology determines elasticity coefficients for ceiling to floor planes (ceiling access points to active sensors), ceiling to ceiling planes (ceiling access points to ceiling access points), and floor to floor planes (active sensor to active sensor). These measurements are combined iteratively to determine the location accuracy deviation in each plane. It should be appreciated that active sensors can be mounted on walls or ceiling and access points are also not restricted to mounting on ceilings.

The overall result is that the present technology results in a system that is more accurate overall, and that is accurate in substantially real time by accounting for dynamic changes in the Wi-Fi environment.

Figure 4:
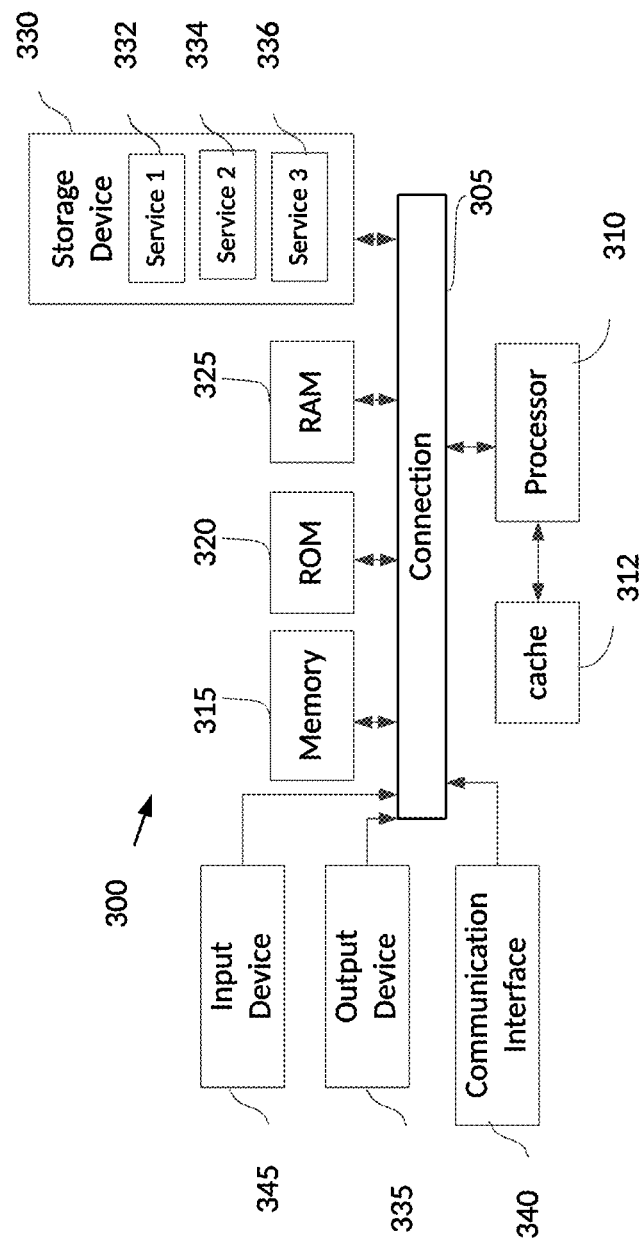
FIG. 4 illustrates an example computing system embodiment in accordance with some aspects of the present technology.

FIG. 4 shows an example of computing system 300, which can be for example any computing device making up enterprise network controller 102, real time location system controller 104, network infrastructure devices 106 or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system comprising:
a real-time location system (RTLS) controller comprising at least one processor and a storage for storing processor executable instructions;
a plurality of network-infrastructure devices, wherein the RTLS controller stores location data in the storage identifying a known location of the network-infrastructure devices;
wherein the instructions stored in the storage of the RTLS controller are effective to cause at least one processor to:
periodically receive a measurements, from at least two of the plurality of network-infrastructure devices, that can be interpreted to derive a location of a first one of the plurality of network-infrastructure devices, wherein respective measurements are relative to a distance from the at least two of the plurality of network-infrastructure devices to the first one of the plurality of network-infrastructure devices;
based on the periodically received measurements, repeatedly derive a calculated location of the first one of the plurality of network-infrastructure devices;
determine that the calculated location of the first one of the plurality of network-infrastructure devices is different than the known location of the first one of the plurality of network-infrastructure devices;
apply at least one elasticity coefficient to at least one measurement from at least two of the plurality of network-infrastructure devices from which the measurements were received.

2. The system of claim 1, wherein an application of the at least elasticity coefficient results in the calculated location of the first one of the plurality of network-infrastructure devices to sufficiently correspond to the known location of the first one of the plurality of network-infrastructure devices.

3. The system of claim 1, wherein the periodically received measurements and application of the at least one elasticity coefficient results in a substantially real time compensation for a present radio frequency (RF) interference.

4. The system of claim 1, wherein the instructions stored in the storage of the RTLS controller are effective to cause at least one processor to:
calculate the at least one elasticity coefficient that results in the calculated location in 3-D space of the first one of the plurality of network-infrastructure devices to sufficiently correspond to the known location of the first one of the plurality of network-infrastructure devices in the 3-D space.

5. The system of claim 1, wherein the calculated location of the first one of the plurality of network-infrastructure devices further utilizes a persistent adjustment coefficient which accounts for an average RF performance in an environment in which the plurality of network-infrastructure devices are installed.

6. The system of claim 5, wherein the instructions stored in the storage of the RTLS controller are effective to cause at least one processor to:
determine that the at least one elasticity coefficient of an approximately constant value is persistently needed for measurements from a specific one of the plurality of network-infrastructure devices in at least one direction of measurement; and
replace the persistent adjustment coefficient for the specific one of the plurality of network-infrastructure devices in the at least one direction of measurement with an updated coefficient that takes into account the at least one elasticity coefficient.

7. The system of claim 1, wherein the at least one elasticity coefficient is specifically applied to future measurements from a specific network-infrastructure device from the specific direction in which the measurements were received.

8. The system of claim 1, wherein the instructions stored in the storage of the RTLS controller are effective to cause at least one processor to:
calculate the location of a portable computing device using measurements from the at least two of the plurality of network-infrastructure devices and applying the at least one elasticity coefficient.

9. A method performed by a real-time location system (RTLS), the method comprising:

periodically receiving measurements, from at least two of a plurality of network-infrastructure devices, that can be interpreted to derive a location of a first one of the plurality of network-infrastructure devices, wherein the respective measurements are relative to a distance from the at least two of the plurality of network-infrastructure devices to the first one of the plurality of network-infrastructure devices;

based on the periodically received measurements, repeatedly deriving a calculated location of the first one of the plurality of network-infrastructure devices;

determining that the calculated location of the first one of the plurality of network-infrastructure devices is different than a known location of the first one of the plurality of network-infrastructure devices;

applying at least one elasticity coefficient to at least one measurement from at least two of the plurality of network-infrastructure devices from which the measurements were received.

10. The method of claim 9, wherein the calculated location of the first one of the plurality of network-infrastructure devices further utilizes a persistent adjustment coefficient which accounts for an average RF performance in an environment in which the plurality of network-infrastructure devices are installed.

11. The method of claim 10, comprising:

determining that the at least one elasticity coefficient of an approximately constant value is persistently needed for measurements from a specific one of the plurality of network-infrastructure devices in at least one direction of measurement; and replace the persistent adjustment coefficient for the specific one of the plurality of network-infrastructure devices in the at least one direction of measurement with an updated coefficient that takes into account the at least one elasticity coefficient.

12. The method of claim 9, comprising:

calculating the location of a portable computing device using measurements from the at least two of the plurality of network-infrastructure devices and applying the at least one elasticity coefficient.

* * * * *